(12) United States Patent
Xu et al.

(10) Patent No.: US 9,576,481 B2
(45) Date of Patent: Feb. 21, 2017

(54) METHOD AND SYSTEM FOR INTELLIGENT TRAFFIC JAM DETECTION

(71) Applicant: HERE Global B.V., Veldhoven (NL)

(72) Inventors: Jingwei Xu, Buffalo Grove, IL (US); Arnold Sheynman, Northbrook, IL (US); Bruce Bernhardt, Wauconda, IL (US); Tony Belkin, Glenview, IL (US); Weimin Huang, Summit, NJ (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 14/700,774

(22) Filed: Apr. 30, 2015

(65) Prior Publication Data
US 2016/0321919 A1 Nov. 3, 2016

(51) Int. Cl.
| G06F 19/00 | (2011.01) |
| G06G 7/76 | (2006.01) |
| G08G 1/01 | (2006.01) |
| G08G 1/052 | (2006.01) |

(52) U.S. Cl.
CPC .......... *G08G 1/0125* (2013.01); *G08G 1/0141* (2013.01); *G08G 1/052* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,131,020 A * | 7/1992 | Liebesny | ............. | G08G 1/0104 340/905 |
| 5,289,183 A * | 2/1994 | Hassett | ................. | G01S 13/765 340/905 |
| 5,554,983 A * | 9/1996 | Kitamura | ................ | G06T 7/204 340/905 |
| 5,610,821 A * | 3/1997 | Gazis | ................. | G01C 21/3492 340/990 |
| 5,663,720 A * | 9/1997 | Weissman | ................ | G08G 1/01 340/905 |
| 6,150,961 A * | 11/2000 | Alewine | ................... | G08G 1/01 340/905 |
| 6,330,453 B1 * | 12/2001 | Suzuki | ................... | G01C 21/32 455/457 |
| 6,505,114 B2 * | 1/2003 | Luciani | ................ | G08G 1/0104 701/117 |
| 6,650,948 B1 * | 11/2003 | Atkinson | ............. | G08G 1/0104 340/995.13 |

(Continued)

FOREIGN PATENT DOCUMENTS

DE 102010021665 A1 1/2011
WO WO-99/30303 A1 6/1999

*Primary Examiner* — Bhavesh V Amin
(74) *Attorney, Agent, or Firm* — Alston & Bird LLP

(57) ABSTRACT

Disclosed is a method, apparatus, system and computer program configured to process traffic data and provide relevant information to a driver of a vehicle. A method that is disclosed includes receiving probe data from mobile probes; deriving, from the received probe data, an approximate traffic jam shape and traffic jam area; determining when and at what point a vehicle enters the traffic jam area, and an estimated trajectory of the vehicle within the traffic jam area; and based on the step of determining, generating and sending a message to the vehicle informing the vehicle of at least an estimated time when the vehicle will exit the traffic jam area.

34 Claims, 7 Drawing Sheets

(56) References Cited

U.S. PATENT DOCUMENTS

| | | | | |
|---|---|---|---|---|
| 7,096,115 B1* | 8/2006 | Groth | G08G 1/092 | 340/905 |
| 7,246,007 B2* | 7/2007 | Ferman | G08G 1/127 | 340/934 |
| 7,813,870 B2* | 10/2010 | Downs | G08G 1/0104 | 340/995.13 |
| 7,831,380 B2* | 11/2010 | Chapman | G08G 1/0104 | 701/118 |
| 7,912,627 B2* | 3/2011 | Downs | G08G 1/0112 | 701/117 |
| 8,280,617 B2* | 10/2012 | Young | G08G 1/0104 | 340/934 |
| 8,289,187 B1* | 10/2012 | Kerr | G08G 1/09626 | 340/901 |
| 2002/0107634 A1* | 8/2002 | Luciani | G08G 1/0104 | 701/117 |
| 2004/0073361 A1* | 4/2004 | Tzamaloukas | G01C 21/3691 | 701/414 |
| 2006/0058941 A1* | 3/2006 | DeKock | G08G 1/0104 | 701/117 |
| 2006/0074546 A1* | 4/2006 | DeKock | G08G 1/01 | 701/117 |
| 2008/0094250 A1* | 4/2008 | Myr | G08G 1/04 | 340/909 |
| 2008/0167955 A1 | 7/2008 | Zerod et al. | | 705/14 |
| 2010/0151838 A1* | 6/2010 | Wormald | G08G 1/096716 | 455/414.1 |
| 2010/0256846 A1* | 10/2010 | Shaffer | B60L 11/184 | 701/22 |
| 2011/0034183 A1* | 2/2011 | Haag | G06Q 50/26 | 455/456.3 |
| 2011/0210867 A1* | 9/2011 | Benedikt | G08G 1/01 | 340/905 |
| 2011/0276198 A1* | 11/2011 | Khatwa | G01C 23/00 | 701/3 |

* cited by examiner

METHOD AND SYSTEM FOR INTELLIGENT TRAFFIC JAM DETECTION

TECHNICAL FIELD

Various non-limiting examples of the embodiments of this invention relate generally to software applications, including those executed on portable computing and communication devices, vehicular traffic processing systems and software, mapping software and applications and to navigation software and applications.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

There are various technologies currently available to provide traffic information. For example, the Traffic Message Channel (TMC) is a technology for broadcasting traffic and travel information to motor vehicle drivers. It is digitally coded, using the Radio Data System (RDS) on conventional FM radio broadcasts. It can also be transmitted on Digital Audio Broadcasting (DAB) or satellite radio. It should be noted that the broadcast RDS-TMC code is not globally unique and that broadcast uniqueness is only required regionally. The combination of Country Code, Table Number, and TMC Location Code is unique globally. An example of another technology is one known as the Transport Protocol Experts Group (TPEG) that was designed for the transmission of language independent multi-modal traffic and travel information.

A traffic congestion jam may occur and begin accumulating as a result of any of a number of occurrences, such as traffic volume exceeding available road capacity, a traffic accident, normal rush hour traffic flow on a specific road segment and as a result some scheduled public event such as a major sporting event. In general, conventional traffic service providers are able, based on multiple input resources, to report real time static traffic incidents/conditions on a specific road segment and send, if appropriate, warning messages to drivers driving upstream (towards) such incidents. However, this type of conventional operation is not sufficient to fully apprise an end user of actual, real-time road traffic conditions so that the end user can make a most effective driving decision.

SUMMARY

The foregoing and other problems are overcome, and other advantages are realized, by the use of the exemplary embodiments of this invention.

In a first aspect thereof the embodiments of this invention provide a method that comprises receiving probe data from mobile probes; deriving, from the received probe data, an approximate traffic jam shape and traffic jam area; determining when and at what point a vehicle enters the traffic jam area, and an estimated trajectory of the vehicle within the traffic jam area; and based on the step of determining, generating and sending a message to the vehicle informing the vehicle of at least an estimated time when the vehicle will exit the traffic jam area.

In a second aspect thereof the embodiments of this invention provide an apparatus that comprises a processor and a memory including computer program code, where the memory and computer program code are configured to, with the processor, cause the apparatus at least to perform operations that comprise, receiving probe data from a plurality of mobile probes; deriving, from the received probe data, a traffic jam shape and traffic jam area; determining when and at what point a vehicle enters the traffic jam area, and an estimated trajectory of the vehicle within the traffic jam area; and based on the operation of determining, generating and sending a message to the vehicle informing the vehicle of at least an estimated time when the vehicle will exit the traffic jam area.

In another non-limiting aspect thereof the embodiments of this invention provide a non-transitory computer-readable medium that contains software program instructions, where execution of the software program instructions by at least one data processor results in performance of operations that comprise receiving probe data from a plurality of mobile probes; deriving, from the received probe data, a traffic jam shape and traffic jam area; determining when and at what point a vehicle enters the traffic jam area, and an estimated trajectory of the vehicle within the traffic jam area; and based on the operation of determining, generating and sending a message to the vehicle informing the vehicle of at least an estimated time when the vehicle will exit the traffic jam area.

In yet another non-limiting aspect thereof the embodiments of this invention provide a system that comprises means for receiving probe data from a plurality of mobile probes; means for deriving, from the received probe data, a traffic jam shape and traffic jam area; means for determining when and at what point a vehicle enters the traffic jam area, and an estimated trajectory of the vehicle within the traffic jam area; and means; responsive to said means for determining, for generating and sending a message to the vehicle informing the vehicle of at least an estimated time when the vehicle will exit the traffic jam area, where the estimated time is based at least in part on when the estimated trajectory of the vehicle and the line representing the border of the traffic jam area intersect.

DETAILED DESCRIPTION

Figure 1:
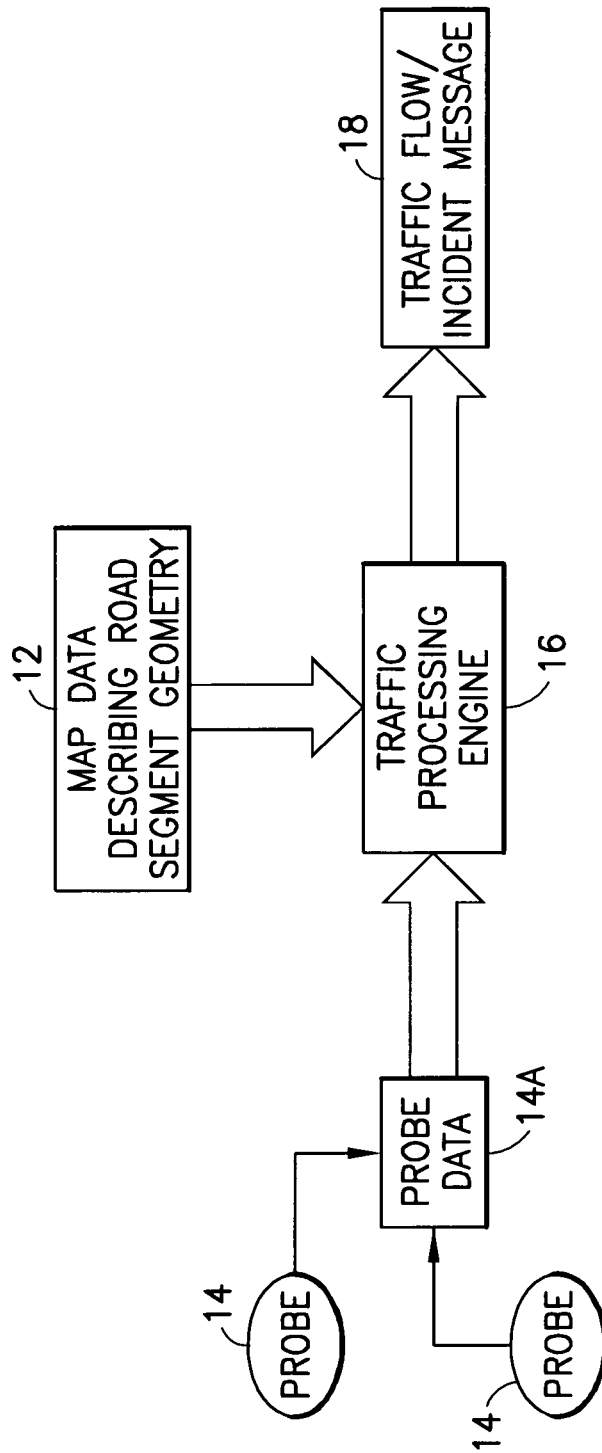
FIG. 1 is a simplified block diagram of a vehicular traffic system containing a traffic processing engine configured to output traffic/flow and traffic incident messages.

The various examples of the embodiments of this invention can be considered to relate in general to a vehicular traffic processing systems, a simplified example of which is shown in FIG. 1 as the system 10. In the vehicular traffic system 10 there is a source of map data 12 that describes road segment geometry, a plurality of mobile probes 14 providing probe data 14A and a traffic processing engine 16 that receives the map data 12 and the probe data 14A. The traffic processing engine 16 outputs traffic flow/incident messages 18, possibly to subscribers to the vehicular traffic system 10. The messages 18 can be delivered to end customers in various ways, such as over-the-air radio interfaces or by connected internet.

The mobile probes 14 can be embodied as and in, in accordance with non-limiting examples, mobile cellular phones, mobile vehicle probes, induction loop sensors, camera sensors, Bluetooth and WiFi sensors and, in general, any type of sensor that can be used to detect and track the speed change of a vehicle.

More specifically, the inputs to the traffic processing engine 16 are real time probe data 14A, received from the probes 14, and map artifact data 12 which describes road segment topology and geometry. Upon receiving the real time probe data 14A the traffic processing engine 16 ingests the probe data 14A and performs steps such as map matching, pathing, etc., and then outputs, such as by TMC or some other technology, an estimate of a current travel speed for a given road segment (e.g., road link). Based on a category of the estimated travel speed the road condition can be described as, for example, free flow, queueing, or stationary. From a user perception perspective a driving speed equal to or lower than a queueing speed could be considered as road congestion.

The embodiments of this invention enable the traffic processing engine 16 to identify a traffic jam or congestion on a particular road segment. Using time buffering of probe-related data the shape of a traffic congestion jam can be identified and an estimate can be made of the congestion jam upstream location and the length of the traffic jam, enabling a system delay time prediction to be made. The traffic processing engine 16 can then deliver a warning message 18 to drivers over one or multiple platforms.

The embodiments of this invention enable the traffic processing engine 16 to detect different road traffic congestion jam shapes and thus provide enhanced traffic services to a customer by delivering a warning message prior to the time the customer encounters the area of the traffic jam.

The use of the embodiments of this invention enable the traffic processing engine 16 to mitigate road accident risk and minimize driving cost by assisting a driver to plan a more optimal route based on real-time actual and estimated road traffic conditions. In one aspect thereof the embodiments of this invention provide a method of traffic jam shape detection, vehicle notification of a traffic jam when driving upstream from the jam, and a traffic forecast for a driving route.

The use of the embodiments of this invention enable a traffic information service provider to generate special warning messages to warn a driving user of entering the traffic jam area (can be multiple TMCs) with traffic jam shape, traffic jam moving speed and traffic jam distance being reported based on system processing, analysis and filtering techniques. Based on the traffic congestion jam shape the system 10 can also predict a release time from the traffic jam and notify the driving user.

The system 10 employs the input probe data 14A originating from multiple mobile sources (e.g., sources associated with community members, service providers, regulators, law enforcement, etc.). The probe data 14A can include, for example, the geographic location of a probe vehicle 14 (e.g., as derived from GPS positioning), the speed of the probe vehicle 14 (as derived from an on-board speed determination unit) and a probe vehicle identification that can be pre-stored in the probe vehicle. The system 10 also employs vehicle path identification with map matching of the vehicle probe trajectory and analysis; traffic jam detection per single vehicle-based path; traffic jam buffering (shown in FIGS. 2 and 4); an identification of traffic jam shape (shown in FIG. 3); a calculated speed and distance (shown in FIGS. 2 and 5); an estimated system process and delay time; and can provide for the delivery of warning messages with the potential upstream front jam location correctly reported.

Figure 2:
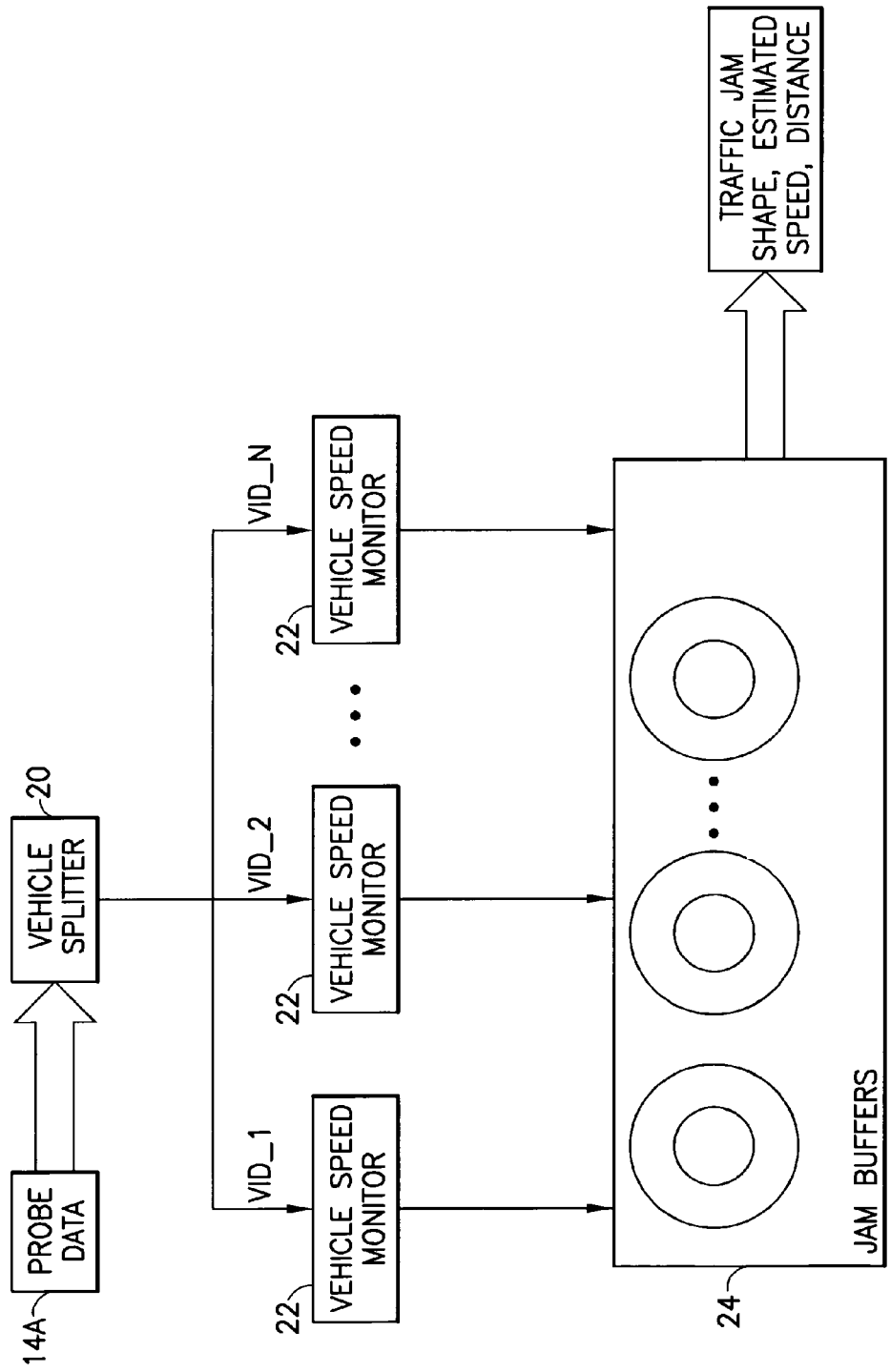
FIG. 2 shows a portion of the vehicular traffic system of FIG. 1, in particular a traffic jam detection system that can form a part of the traffic processing engine.

Further in this regard, FIG. 2 shows what may be considered as a portion of the vehicular traffic system 10 that appears in FIG. 1, in particular a traffic jam detection system 16A that can form a part of the traffic processing engine 16. In FIG. 2 the input probe data 14A are segmented by probe ID and cached by a probe vehicle splitter 20 prior to jam processing. An instance of a vehicle speed monitor 22 can be assigned per probe vehicle 14 of interest in order to detect a potential traffic jam (indicated by the speed of the probe vehicle 14 decreasing or going to zero). Once a jam is detected for a probe vehicle 14 by the associated vehicle speed monitor 22, by a "significant" speed drop within some relatively short period of time (e.g., seconds or tens of seconds), the event is buffered with the VID (vehicle identity) into one or more jam buffers 24 (shown in FIG. 5). The traffic jam detection system 16A then uses the position and time in the jam buffer to calculate a slope which represents a traffic jam's upstream moving speed.

More particularly, the detected jam per probe vehicle 14 is buffered into a predefined buffer ring associated with corresponding road segments (in cooperation with the map data 12 that describes the road geometry shown in FIG. 1). The detected jam is dynamically allocated into the buffer ring to which it belongs. The buffer ring grows dynamically per jam distance or time. The deletion of a jam buffer 24 is preferably based on time.

Using heuristic knowledge applied to data in the jam buffers 24 the system can detect various different accumulated traffic jam shapes, examples of which are shown in FIG. 3. In FIG. 3A a 'normal' traffic jam shape is depicted, in FIG. 3B a 'static' traffic jam shape is depicted, in FIG. 3C a 'wide moving' traffic jam shape is depicted, and in FIG. 3D a 'mixed' traffic jam shape is depicted. Each traffic jam shape exhibits its own unique traffic behavior, and an accurate identification of the traffic jam shapes is important when providing service quality reporting (message 18). The traffic jam shape directly indicates the road traffic conditions and can thus be used for traffic prediction. Also, the traffic jam distance and jam upstream location are provided based on the congestion jam shape and the system time delay estimation.

The heuristic knowledge can include, but need not be limited to, knowledge of the road geometry/topology, the type of road, and road characteristics such as the presence of a toll booth. For the case of the toll booth it may be assumed that vehicles approaching the toll booth will slow down, and this condition would not be considered as a traffic jam that needs to be reported.

Figure 3A:
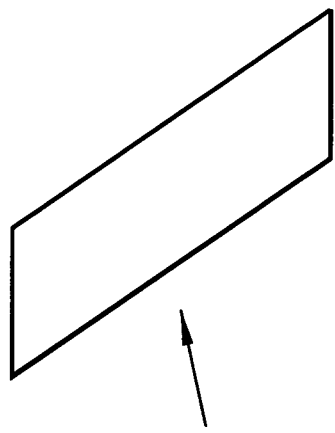
FIGS. 3A-3D, collectively referred to as FIG. 3, illustrate examples of accumulated traffic jam shapes.
Figure 3B:
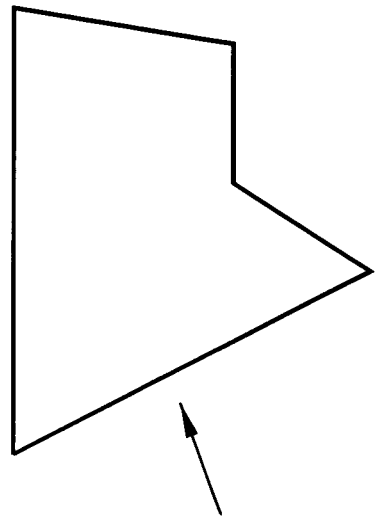
Figure 3C:
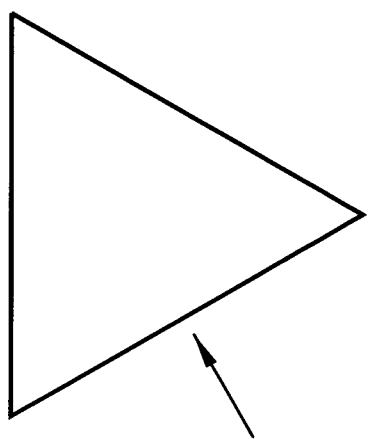
Figure 3D:
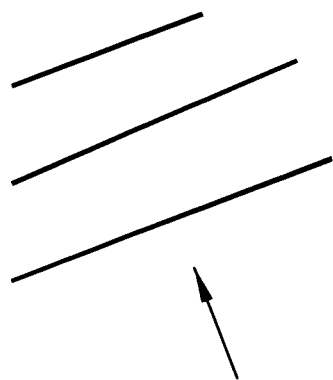

In further detail, the determined traffic jam shapes shown in FIG. 3 indicate, based on the direction of travel and where the jam is entered (shown by an arrow pointing in the upstream direction), if the traffic congestion JAM is static (basically stopped or very slowly moving, FIG. 3B), moving (FIG. 3A), wide moving (FIG. 3C) or mixed (FIG. 3D). For example, in the static traffic jam (FIG. 3B) the downstream traffic jam front does not move (e.g., a segment of road may be temporarily closed) and only the upstream jam front position is growing and releasing.

Figure 4:
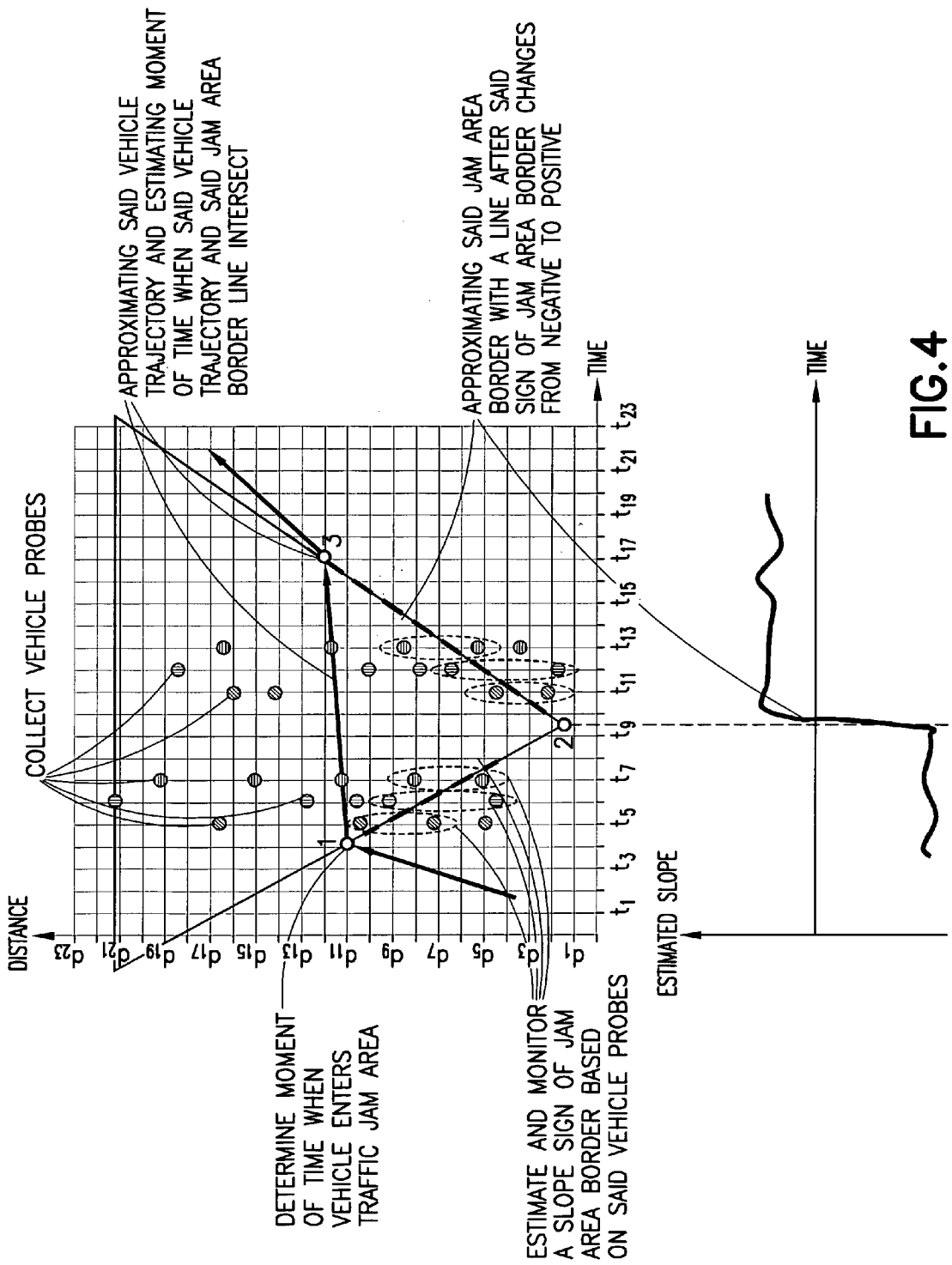
FIG. 4 is a diagram that is useful in explaining a method for identifying a particular traffic jam shape and for vehicle notification of a traffic jam area end.

FIG. 4 is useful in explaining a method for identifying the traffic jam shape and for vehicle notification of a traffic jam area end. In the method, the vehicular traffic system 10 determines a point in time when a vehicle enters a traffic jam area (indicated as point 1 in FIG. 4). The system 10 collects information from vehicle probes 14. The system 10 then estimates and monitors a slope sign of a jam area border based on certain pairs (shown as ovals) of the vehicle probes 14. The system 10 next approximates the jam area border with a line after the sign of the jam area border changes from negative to positive (indicated as point 2 in FIG. 4). The system 10 then extrapolates the vehicle trajectory and estimates based on speed a moment in time when the vehicle trajectory and the jam area border line intersect (indicated as point 3 in FIG. 4). The system 10 can then deliver to the vehicle the estimated moment in time when the vehicle will exit the traffic jam area.

Figure 5:
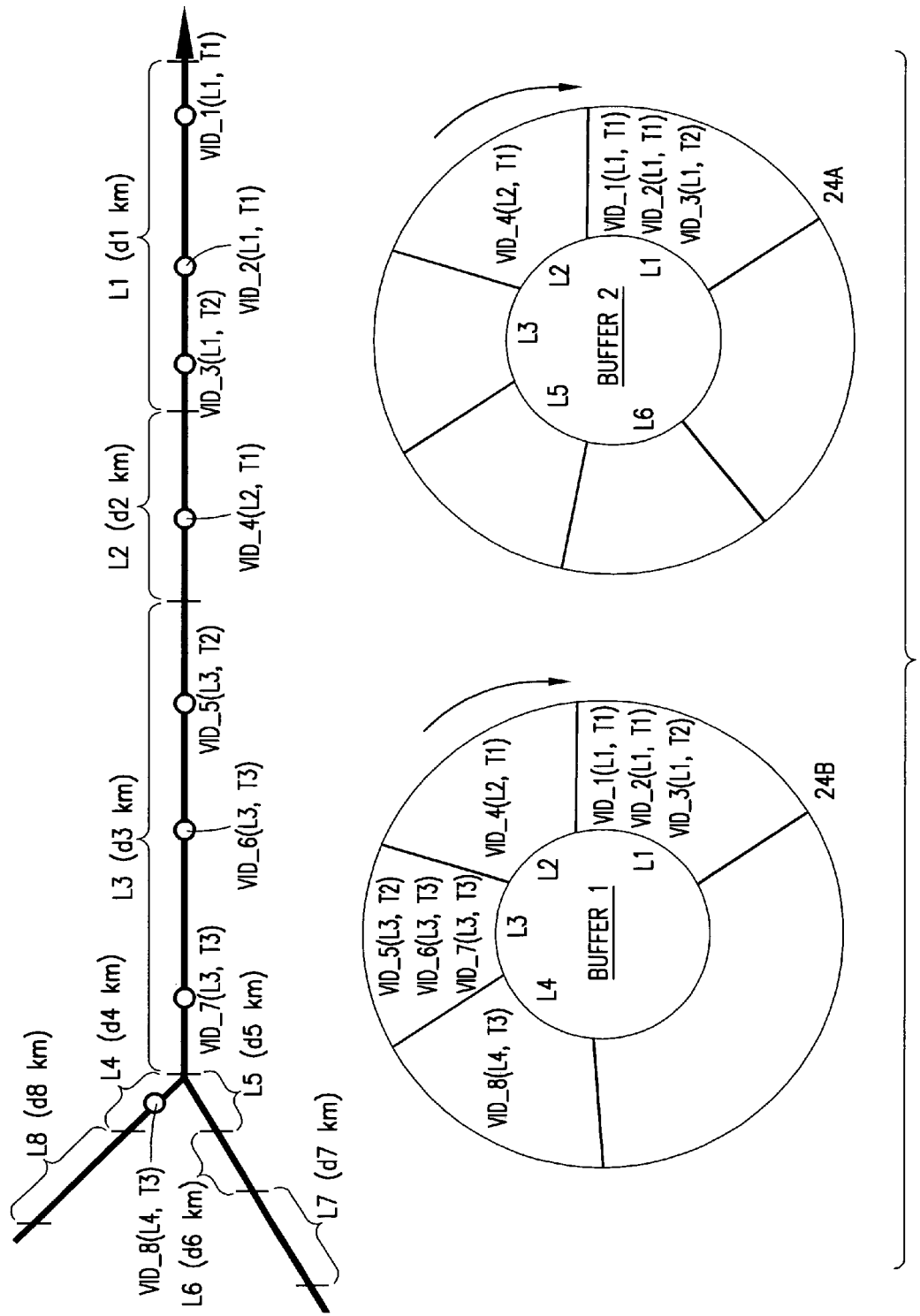
FIG. 5 illustrates an example of a road segment and examples of traffic jam ring buffers used for traffic jam shape detection, speed and jam length detection.

FIG. 5 illustrates in greater detail how traffic jam buffering can be used for traffic jam shape detection, speed and jam length detection. FIG. 5 also illustrates how the dynamic buffer rings 24 can be used for congestion jam detection. The top portion of FIG. 5 shows an example of predefined road segments which represent the general road topology. This type of data is obtained from the map data 12 shown in FIG. 1. The map data 12 can be stored in one or more map databases and retrieved when needed. In this example the road segment consists of eight links defined L1 to L8 with length d1 to d8 km. The road has a split (fork) at the left end of link L3. As a result there are two possible paths for a vehicle to traverse: L8, L4, L3, L2, L1 (top fork) and L7, L6, L5, L3, L2, L1 (bottom fork). At a time when the jam congestion begins to accumulate from L1 three vehicle probe trajectories (VID_1-VID_3) are identified with the congestion jam and are stored into the buffer 24 with the associated time (T). When the accumulating congestion reaches the split point of the road (at the left end of segment L3) the ring buffer dynamically splits into two in order to match the road topology. The ring buffer 24A corresponds to the original ring buffer and includes segments L1, L2, L3, L5 and L6 (the lower fork in the road) while the ring buffer 24B includes segments L1, L2, L3 and L4 (the upper fork in the road). The traffic jam events stored in the buffer 24 are used for jam shape detection, jam front position calculation and jam distance calculation.

In FIG. 5, when a "significant speed drop" of a probe vehicle 14 is detected the event is buffered with the VID (probe vehicle identity) and the sampling time T. The position and time in the buffer is then used to calculate the slope which corresponds to the moving jam's upstream speed.

Figure 6:
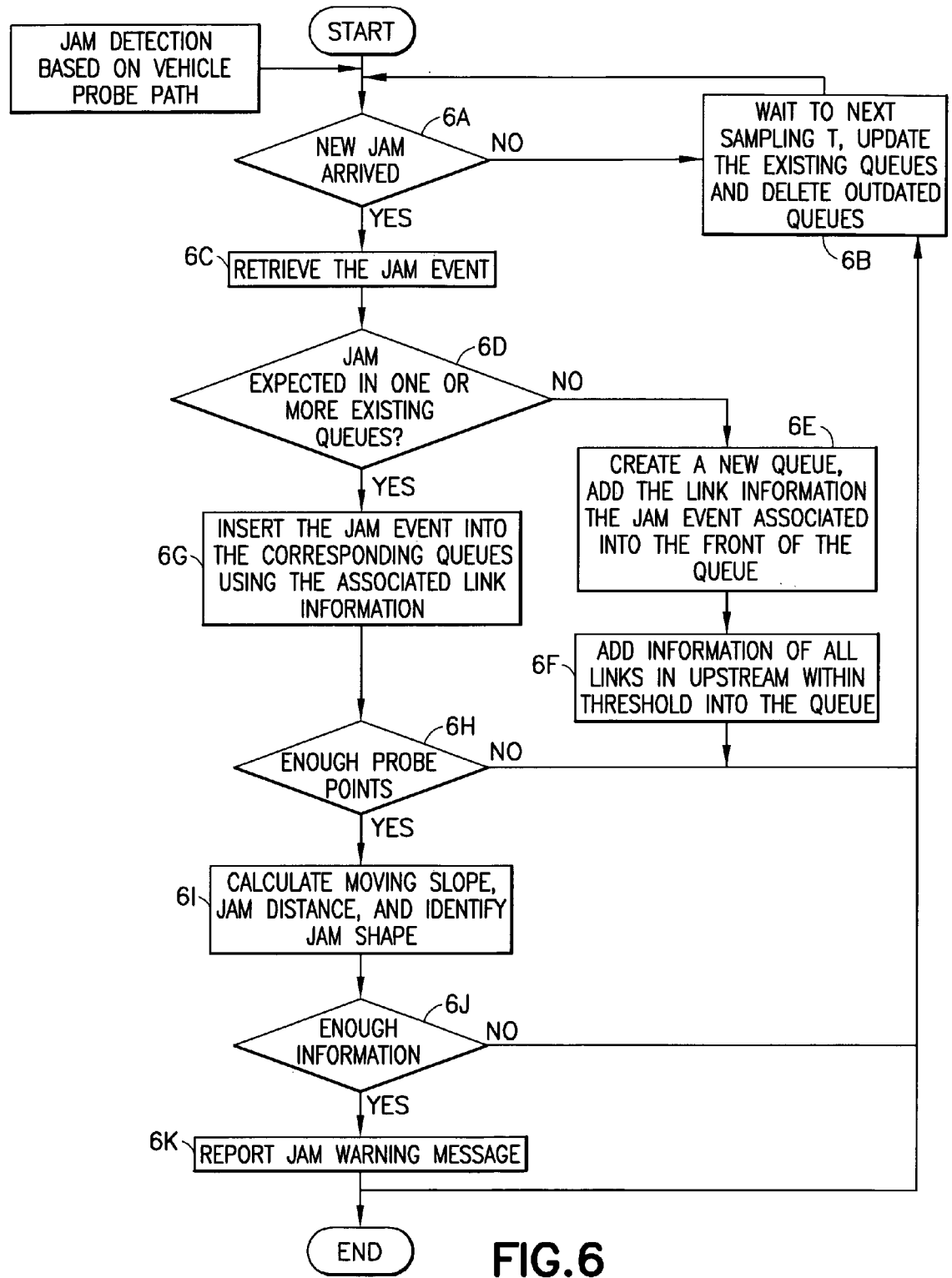
FIG. 6 is a logic flow diagram in flow chart form that illustrates the operation of a method, and a result of execution of computer program instructions embodied on a computer readable medium, in accordance with the embodiments of this invention.

FIG. 6 is a flowchart showing traffic system jam identification and reporting in accordance with embodiments of this invention. In this method a traffic congestion jam is detected based on probe vehicle path and speed which is monitored and updated continuously. The traffic processing engine 16 checks the input congestion jam to decide whether or not to trigger a jam process (Block 6A). If no jam detected the traffic processing engine 16 waits until a next sampling time (T), updates existing queues (buffers 24) and deletes outdated queues (Block 6B). If a jam is detected at Block 6A the system retrieves the jam event (Block 6C) and determines if a jam is expected in one or more existing buffers 24 (Block 6D). If not, control passes to Block 6E to create a new queue and add the link information for the associated jam event at the head of the queue (buffer 24). At Block 6F the system 10 adds information into the queue of all links in the upstream within some threshold number of links. Control then returns to Block 6B. If instead at Block 6D it is determined that a jam is expected in one or more existing buffers 24 then control passes to Block 6G where the detected jam event is inserted into one or more of the existing queues using the associated link information. The traffic monitoring system 10 then checks whether a sufficient number of probe vehicle 14 jam data points have been collected into the queue. If not, control passes to Block 6B to wait until the next sampling time otherwise control passes to Block 6I to calculate the slope, the jam distance, and to calculate the jam shape. At Block 6J a determination is made whether the system 10 has sufficient information to report a traffic jam warning message. If not control passes back to Block 6B to gather more probe vehicle 14 data while if yes control passes to Block 6K to report the traffic jam warning.

The various blocks shown in FIG. 6 may be viewed as method steps, and/or as operations that result from operation of computer program code, and/or as a plurality of coupled logic circuit elements constructed to carry out the associated function(s).

Figure 7:
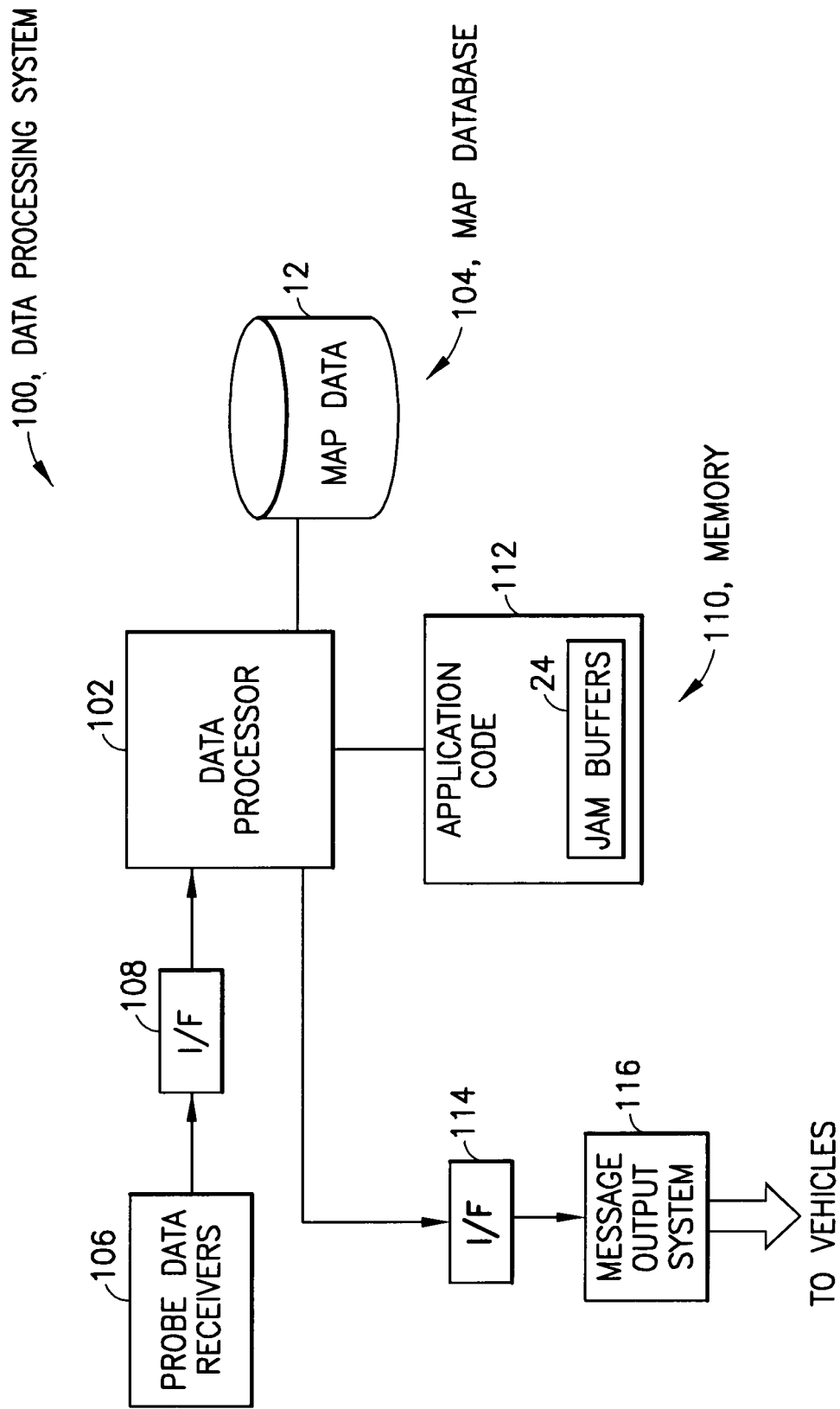
FIG. 7 is a block diagram of a data processing system that is suitable for implementing the vehicular traffic system shown in FIG. 1 including the traffic jam detection system shown in FIG. 2.

FIG. 7 is a block diagram of a data processing system 100 that is suitable for implementing the vehicular traffic system 10 shown in FIG. 1 including the traffic jam detection system 16A shown in FIG. 2. The data processing system 100 includes at least one data processor 102 connected with a memory 104 that stores application code 112 for implementing the methods of this invention. Execution of the application code 112 instantiates the traffic processing engine 16 and related components, including the traffic jam detection system 16A, vehicle splitter 20 and vehicle speed monitors 22 shown in FIG. 2. The memory 110 can also store the jam buffers 24. Also connected with the data processor 102 is a map database 104 that stores the map data 12. The map database 104 can be co-located with the data processor 102 or it can be remotely located and connected via any suitable data connection network including the internet. The system 100 also includes probe data receivers 106 that are connected to the data processor 102 via a suitable interface (I/F) 108. The probe data receivers 106 are preferably some type of wireless radio receivers and can be implemented using cellular radio technology or any suitable type of wireless technology configured to receive the probe data 14A from the probe vehicles 14. A message output system 116 is connected to the data processor 102 via a suitable interface (I/F) 114 for sending the traffic flow/incident messages 18 to vehicles configured to receive the messages 18. The message output system 116 can be based on, for example, the above-mentioned Traffic Message Channel (TMC) system or any other suitable type of wireless technology (e.g., TPEG) capable of delivering the messages 18. In some embodiments the message output system 116 can also include an interface to a data network such as the internet whereby the messages could be delivered to a home computer other device, such as a tablet. In some embodiments the messages 18 can be delivered via electronic mail (email) and/or text messages such as short message service (SMS) or instant messaging (IM).

The application code 112, which can also be referred to as an application program or simply as a program, is assumed to include program instructions that, when executed by the associated at least one data processor 102, enables the system to operate in accordance with the various examples of the embodiments of this invention as discussed above. The embodiments of this invention may be implemented at least in part by computer software executable by the data processor 102 or by hardware, or by a combination of software and hardware (and firmware).

The data processor, memories, programs, receivers, transmitters and interfaces depicted in FIG. 7 can all be considered to represent means for performing operations and functions that implement the several non-limiting aspects and embodiments of this invention. For example, the data processor, memories, programs, receivers, transmitters and interfaces can be considered as instantiating various means for receiving probe data from a plurality of mobile probes; means for deriving, from the received probe data, a traffic jam shape and traffic jam areas; means for determining when and at what point a vehicle enters the traffic jam area, and an estimated trajectory of the vehicle within the traffic jam area; and means, responsive to the means for determining, for generating and sending a message to the vehicle informing the vehicle of at least an estimated time when the vehicle will exit the traffic jam area. As should thus be appreciated the details of the construction of these various devices can vary widely and, in many cases, can be implementation-specific. Further, it should be appreciated that the several devices, components, sub-systems and the like depicted in FIG. 7, separately and in combination, may be viewed as representing the various means for implementing the exemplary embodiments of this invention.

Note that the data processing system 100 could be physically instantiated at one or more locations, or it could be virtually instantiated in whole or in part in a cloud computing environment.

The memory 110 and database 104 may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processor 102 may also be of any type suitable to the local technical environment and may include one or more of general purpose computers, special purpose computers, microprocessors, digital signal processors (DSPs) and processors based on multi-core processor architectures, as non-limiting examples.

Based on the foregoing it should be apparent that the embodiments of this invention provide a method, apparatus and computer program(s) to derive, from probe data received from mobile probes, an approximate traffic jam shape and area, and to send a message to a vehicle informing the vehicle of an approximate time when the vehicle will exit the traffic jam area.

It should be apparent that an aspect of this invention is a method that includes, for example, receiving probe data from a plurality of mobile probes; deriving, from the received probe data, a traffic jam shape and traffic jam area; determining when and at what point a vehicle enters the traffic jam area, and an estimated trajectory of the vehicle within the traffic jam area; and based on the step of determining, generating and sending a message to the vehicle informing the vehicle of at least an estimated time when the vehicle will exit the traffic jam area. The probe data can comprise, for example, an identification of a mobile probe that transmits the probe data, a location of the mobile probe, and a speed of the mobile probe. Each of the plurality of mobile probes can include a sensor configured to detect and track a speed change of a vehicle.

The method can operate, when deriving the traffic jam shape and traffic jam area, by estimating a slope sign of a border of the traffic jam area based on probe data received from certain pairs of the mobile probes and approximating as a line the border of the traffic jam area after a sign of the border of the traffic jam area changes polarity, such as from negative to positive.

In the method the estimated time can be based at least in part on when the trajectory of the vehicle and the line representing the border of the traffic jam area intersect. In the method the estimated trajectory can be determined at least in part from topography of one or more road segments on which the vehicle travels, where the road segments can be obtained from map data, such as map data stored in a local or remote map data database.

In the method deriving the traffic jam shape and traffic jam area can include buffering a representation of individual ones the mobile probes in at least one buffer that is partitioned based on sequential road segments obtained from map data, and periodically updating the at least one buffer to reflect a change of mobile probes as they enter and exit the road segments. In this case a position in the buffer and an amount of time spent in the buffer for the individual ones of the mobile probes can be employed when determining a slope of the border of the traffic jam area. In the method a representation of a particular mobile probe can be stored in the buffer based on a detected decrease in speed of the mobile probe.

The method could be performed by the execution of computer program code stored on or in some suitable data storage/conveyance, such as a semiconductor memory or a disk.

A system can be configured to execute the method.

The various embodiments of this invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Various modifications and adaptations to the foregoing embodiments of this invention may become apparent to those skilled in the relevant arts in view of the foregoing description, when read in conjunction with the accompanying drawings. However, any and all modifications will fall within the scope of the non-limiting examples of the embodiments of this invention.

For example, while the exemplary embodiments have been described above in the context of TMC and other types of technologies such as TPEG for reporting traffic events to drivers, it should be appreciated that the embodiments of this invention are not limited for use with only these particular types of wireless communication systems, and that they may be used to advantage with other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the names used for any of the described parameters are not intended to be limiting in any respect, as these parameters may be identified by any suitable names. Further, any formulas and expressions that use these various parameters may differ from those expressly disclosed herein. Further, the various names assigned to different system components and sub-systems, e.g., vehicle splitter, vehicle speed monitor, etc., are not intended to be limiting in any respect, as these various components and sub-systems may be identified by any suitable names.

Furthermore, some of the features of the various non-limiting examples of the embodiments of this invention may be used to advantage without the corresponding use of other features. As such, the foregoing description should be considered as merely illustrative of the principles, teachings and embodiments of this invention, and not in limitation thereof.

What is claimed is:

1. A method, comprising:
   receiving probe data from a plurality of mobile probes;
   deriving, from the received probe data, a traffic jam shape and traffic jam area based at least in part on a slope sign of a border of the traffic jam area estimated based on at least a portion of the probe data;
   determining when and at what point a vehicle enters the traffic jam area, and an estimated trajectory of the vehicle within the traffic jam area; and
   based on the determining, generating and sending a message to the vehicle informing the vehicle of at least an estimated time when the vehicle will exit the traffic jam area.

2. The method as in claim 1, where the probe data comprises an identification of a mobile probe that transmits the probe data, a location of the mobile probe, and a speed of the mobile probe.

3. The method as in claim 1, where deriving comprises:
   estimating a slope sign of a border of the traffic jam area based on probe data received from certain pairs of the mobile probes; and
   approximating as a line the border of the traffic jam area after a sign of the border of the traffic jam area changes polarity.

4. The method as in claim 3, where the change in polarity is from negative to positive.

5. The method as in claim 1, where the estimated time is based at least in part on when the trajectory of the vehicle and the line representing the border of the traffic jam area intersect.

6. The method as in claim 1, where the estimated trajectory is determined at least in part from topography of one or more road segments on which the vehicle travels, where the road segments are obtained from map data.

7. The method as in claim 3, where deriving the traffic jam shape and traffic jam area comprises:
   buffering a representation of individual ones the mobile probes in at least one buffer that is partitioned based on sequential road segments obtained from map data; and
   periodically updating the at least one buffer to reflect a change of mobile probes as they enter and exit the road segments;
   where a position in the buffer and an amount of time spent in the buffer for the individual ones of the mobile probes are used when determining a slope of the border of the traffic jam area.

8. The method as in claim 7, where a representation of a particular mobile probe is stored in the buffer based on a detected decrease in speed of the mobile probe.

9. The method as in claim 1, where each of the plurality of mobile probes comprises a sensor configured to detect and track a speed change of a vehicle.

10. An apparatus, comprising:
    a processor; and
    a memory including computer program code, where the memory and computer program code are configured to, with the processor, cause the apparatus at least to perform operations that comprise:
    receiving probe data from a plurality of mobile probes;
    deriving, from the received probe data, a traffic jam shape and traffic jam area based at least in part on a slope sign of a border of the traffic jam area estimated based on at least a portion of the probe data;
    determining when and at what point a vehicle enters the traffic jam area, and an estimated trajectory of the vehicle within the traffic jam area; and
    based on the operation of determining, generating and sending a message to the vehicle informing the vehicle of at least an estimated time when the vehicle will exit the traffic jam area.

11. The apparatus as in claim 10, where the probe data comprises an identification of a mobile probe that transmits the probe data, a location of the mobile probe, and a speed of the mobile probe.

12. The apparatus as in claim 10, where the operation of deriving comprises:
    estimating a slope sign of a border of the traffic jam area based on probe data received from certain pairs of the mobile probes; and
    approximating as a line the border of the traffic jam area after a sign of the border of the traffic jam area changes polarity.

13. The apparatus as in claim 12, where the change in polarity is from negative to positive.

14. The apparatus as in claim 10, where the estimated time is based at least in part on when the trajectory of the vehicle and the line representing the border of the traffic jam area intersect.

15. The apparatus as in claim 10, where the estimated trajectory is determined at least in part from topography of one or more road segments on which the vehicle travels, where the road segments are obtained from map data.

16. The apparatus as in claim 12, where the operation of deriving the traffic jam shape and traffic jam area comprises:
    buffering a representation of individual ones the mobile probes in at least one buffer that is partitioned based on sequential road segments obtained from map data; and
    periodically updating the at least one buffer to reflect a change of mobile probes as they enter and exit the road segments;
    where a position in the buffer and an amount of time spent in the buffer for the individual ones of the mobile probes are used when determining a slope of the border of the traffic jam area.

17. The apparatus as in claim 16, where a representation of a particular mobile probe is stored in the buffer based on a detected decrease in speed of the mobile probe.

18. The apparatus as claim 10, where each of the plurality of mobile probes comprises a sensor configured to detect and track a speed change of a vehicle.

19. A non-transitory computer-readable medium that contains software program instructions, where execution of the software program instructions by at least one data processor results in performance of operations that comprise:
    receiving probe data from a plurality of mobile probes;
    deriving, from the received probe data, a traffic jam shape and traffic jam area based at least in part on a slope sign of a border of the traffic jam area estimated based on at least a portion of the probe data;
    determining when and at what point a vehicle enters the traffic jam area, and an estimated trajectory of the vehicle within the traffic jam area; and
    based on the operation of determining, generating and sending a message to the vehicle informing the vehicle of at least an estimated time when the vehicle will exit the traffic jam area.

20. The non-transitory computer-readable medium as in claim 19, where the probe data comprises an identification of a mobile probe that transmits the probe data, a location of the mobile probe, and a speed of the mobile probe.

21. The non-transitory computer-readable medium as in claim 19, where deriving comprises:
    estimating a slope sign of a border of the traffic jam area based on probe data received from certain pairs of the mobile probes; and
    approximating as a line the border of the traffic jam area after a sign of the border of the traffic jam area changes polarity.

22. The non-transitory computer-readable medium as in claim 21, where the change in polarity is from negative to positive.

23. The non-transitory computer-readable medium as in claim 19, where the estimated time is based at least in part on when the trajectory of the vehicle and the line representing the border of the traffic jam area intersect.

24. The non-transitory computer-readable medium as in claim 19, where the estimated trajectory is determined at least in part from topography of one or more road segments on which the vehicle travels, where the road segments are obtained from map data.

25. The non-transitory computer-readable medium as in claim 21, where deriving the traffic jam shape and traffic jam area comprises:
    buffering a representation of individual ones the mobile probes in at least one buffer that is partitioned based on sequential road segments obtained from map data; and
    periodically updating the at least one buffer to reflect a change of mobile probes as they enter and exit the road segments;
    where a position in the buffer and an amount of time spent in the buffer for the individual ones of the mobile probes are used when determining a slope of the border of the traffic jam area.

26. The non-transitory computer-readable medium as in claim 25, where a representation of a particular mobile probe is stored in the buffer based on a detected decrease in speed of the mobile probe.

27. The non-transitory computer-readable medium as in claim 19, where each of the plurality of mobile probes comprises a sensor configured to detect and track a speed change of a vehicle.

28. A system comprising:
    means for receiving probe data from a plurality of mobile probes;
    means for deriving, from the received probe data, a traffic jam shape and traffic jam area based at least in part on a slope sign of a border of the traffic jam area estimated based on at least a portion of the probe data;
    means for determining when and at what point a vehicle enters the traffic jam area, and an estimated trajectory of the vehicle within the traffic jam area; and
    means, responsive to said means for determining, for generating and sending a message to the vehicle informing the vehicle of at least an estimated time when the vehicle will exit the traffic jam area, where the estimated time is based at least in part on when the estimated trajectory of the vehicle and the line representing the border of the traffic jam area intersect.

29. The system as in claim 28, where the probe data comprises an identification of a mobile probe that transmits the probe data, a location of the mobile probe, and a speed of the mobile probe.

30. The system as in claim 28, where said means for deriving comprises:
    means for estimating a slope sign of a border of the traffic jam area based on probe data received from certain pairs of the mobile probes; and
    means for approximating as a line the border of the traffic jam area after a sign of the border of the traffic jam area changes polarity, where the change in polarity is from negative to positive.

31. The system as in claim 28, where the estimated trajectory is determined at least in part from topography of one or more road segments on which the vehicle travels, where the road segments are obtained from map data.

32. The system as in claim 28, where said means for deriving the traffic jam shape and traffic jam area comprises:
    means for buffering a representation of individual ones the mobile probes in at least one buffer that is partitioned based on sequential road segments obtained from map data; and
    means for periodically updating the at least one buffer to reflect a change of mobile probes as they enter and exit the road segments;
    where a position in the buffer and an amount of time spent in the buffer for the individual ones of the mobile probes are used when determining a slope of the border of the traffic jam area.

33. The system as in claim 32, where a representation of a particular mobile probe is stored in the buffer based on a detected decrease in speed of the mobile probe.

34. The system as in claim 28, where each of the plurality of mobile probes comprises a sensor configured to detect and track a speed change of a vehicle.

* * * * *